United States Patent
Friedrich et al.

(10) Patent No.: US 10,817,365 B2
(45) Date of Patent: Oct. 27, 2020

(54) ANOMALY DETECTION FOR INCREMENTAL APPLICATION DEPLOYMENTS

(71) Applicant: Adobe Inc., San Jose, CA (US)

(72) Inventors: Michael Gebhard Friedrich, Hamburg (DE); Kim Antonia Reichert, Hamburg (DE)

(73) Assignee: Adobe Inc., San Jose, CA (US)

( * ) Notice: Subject to any disclaimer, the term of this patent is extended or adjusted under 35 U.S.C. 154(b) by 174 days.

(21) Appl. No.: 16/185,505

(22) Filed: Nov. 9, 2018

(65) Prior Publication Data
US 2020/0151041 A1    May 14, 2020

(51) Int. Cl.
| | | |
|---|---|---|
| G06F 11/00 | (2006.01) | |
| G06F 11/07 | (2006.01) | |
| G06F 8/60 | (2018.01) | |
| G06F 40/40 | (2020.01) | |

(52) U.S. Cl.
CPC .............. *G06F 11/079* (2013.01); *G06F 8/60* (2013.01); *G06F 11/0709* (2013.01); *G06F 11/0751* (2013.01); *G06F 11/0772* (2013.01); G06F 40/40 (2020.01)

(58) Field of Classification Search
CPC .... G06F 8/60; G06F 11/0709; G06F 11/0751; G06F 11/0772; G06F 11/079
See application file for complete search history.

(56) References Cited

U.S. PATENT DOCUMENTS

| | | |
|---|---|---|
| 5,995,119 A | 11/1999 | Cosatto et al. |
| 6,532,011 B1 | 3/2003 | Francini et al. |
| 6,993,163 B2 | 1/2006 | Liu et al. |
| 8,437,514 B2 | 5/2013 | Wen et al. |
| 8,830,244 B2 | 9/2014 | Kanemaru et al. |
| 8,831,379 B2 | 9/2014 | Wen et al. |
| 10,607,065 B2 | 3/2020 | Milman et al. |
| 2007/0097965 A1* | 5/2007 | Qiao .................... G06T 3/4007 370/376 |
| 2009/0252435 A1 | 10/2009 | Wen et al. |

(Continued)

OTHER PUBLICATIONS

"K-Fold Cross Validation", Retrieved at: https://en.wikipedia.org/wiki/Cross-validation%5C_(statistics)#k-fold%5C_cross-validation—on Aug. 7, 2018, 1 page.

(Continued)

*Primary Examiner* — Joshua P Lottich
(74) *Attorney, Agent, or Firm* — SBMC

(57) ABSTRACT

In implementations of anomaly detection for incremental application deployments, one or more computing devices of a system implement an evaluation module for anomaly detection. An error record of a legacy version of a software application is generated, as well as an error record of an incremental version of the application. Data in the error record of the legacy version of the application is organized and grouped into one or more groups, each group having a membership criterion. Data in the error record of the incremental application is organized and compared to the one or more groups of the legacy application error record data based on the membership criterion for each group. If an organized data of the incremental application does not belong to any of the groups, then the organized data is identified as an anomaly.

20 Claims, 6 Drawing Sheets

(56) References Cited

U.S. PATENT DOCUMENTS

| | | |
|---|---|---|
| 2011/0148868 A1 | 6/2011 | Chang et al. |
| 2015/0035825 A1 | 2/2015 | Zhou et al. |
| 2016/0284017 A1 | 9/2016 | Almog et al. |
| 2017/0213378 A1 | 7/2017 | Mandel et al. |
| 2018/0068482 A1 | 3/2018 | Yam |
| 2018/0091732 A1 | 3/2018 | Wilson et al. |
| 2018/0268595 A1 | 9/2018 | Sarna et al. |
| 2018/0300927 A1 | 10/2018 | Hushchyn et al. |
| 2019/0138420 A1* | 5/2019 | Harutyunyan ...... G06F 11/3006 |
| 2019/0266807 A1 | 8/2019 | Lee et al. |
| 2019/0340419 A1 | 11/2019 | Milman et al. |

OTHER PUBLICATIONS

"Moving / Average—Wikipedia", Retrieved at: https://en.wikipedia.org/wiki/Moving%5C_average—on Aug. 7, 2018, 1 page.

Aceto,"Cloud monitoring: A survey", Jun. 19, 2013, 23 pages.

Avizienis,"Dependability and Its Threats: A Taxonomy", Jan. 2004, 31 pages.

Baddar,"Anomaly Detection in Computer Networks: A State-of-the-Art Review", Dec. 2014, pp. 29-64.

Barford,"A Signal Analysis of Network Traffic Anomalies", In: The Second ACM SIGCOMM Workshop (2002), Nov. 2002, 12 pages.

Caron,"Auto-Scaling, Load Balancing and Monitoring in Commercial and Open-Source Clouds", Feb. 10, 2012, 28 pages.

Chandola,"Anomaly Detection : A Survey", Jul. 1, 2009, 72 pages.

Cheng,"Detection and Characterization of Anomalies in Multivariate Time Series", In: Proc. SIAM (2009), Apr. 2009, pp. 413-424.

Cohen,"Correlating instrumentation data to system states: A building block for automated diagnosis and control", Oct. 19, 2004, 15 pages.

Dullmann,"Performance Anomaly Detection in Microservice Architectures Under Continuous Change", Jan. 3, 2017, 89 pages.

Dunning,"Practical Machine Learning: A New Look At Anomaly Detection", Jun. 2014, 66 pages.

Fu,"Execution Anomaly Detection in Distributed Systems through Unstructured Log Analysis", In: Proceedings of IEEE International Conference on Data Mining, Dec. 2009, 10 pages.

Goldstein,"A Comparative Evaluation of Unsupervised Anomaly Detection Algorithms for Multivariate Data", Apr. 19, 2016, 31 pages.

Gu,"Online Anomaly Prediction for Robust Cluster Systems", In: Proc.—International Conference on Data Engineering (2009), Mar. 29, 2009, 12 pages.

Gupta,"Context-Aware Time Series Anomaly Detection for Complex Systems", In: Proc. of the SDM Workshop on Data Mining for Service and Maintenance (2013), Jan. 1, 2013, pp. 14-22.

Hole,"Anomaly Detection with HTM—Chapter 12", In: Antifragile ICT Systems. Springer International Publishing, 2016., Jan. 2016, pp. 125-132.

Ibidunmoye,"Performance Anomaly Detection and Bottleneck Identification", Jul. 3, 2015, 37 pages.

Leitner,"Application-Level Performance Monitoring of Cloud Services Based on the Complex Event Processing Paradigm", In: 2012 Fifth IEEE International Conference on Service-Oriented Computing and Applications (SOCA) (2012), Dec. 2012, 8 pages.

Liu,"Isolation Forest", ICDM'08. Eighth IEEE International Conference on. IEEE. 2008, Dec. 2008, 10 pages.

Mazel,"A Taxonomy of Anomalies in Backbone Network Traffic", 10th International Wireless Communications and Mobile Computing Conference (2014),, Aug. 2014, pp. 30-36.

Mirkovic,"A Taxonomy of DDoS Attack and DDoS Defense Mechanisms", In: SIGCOMM Comput. Commun. Rev. 34.2 (2004), Apr. 2004, pp. 39-54.

Niggemann,"Learning Behavior Models for Hybrid Timed Systems", Jul. 2012, 9 pages.

Pedregosa,"Scikit-learn: Machine Learning in Python", In: Journal of Machine Learning Research 12 (2011), Oct. 2011, 7 pages.

Pertet,"Causes of Failure in Web Applications", In: Parallel Data Laboratory, Dec. 2005, 19 pages.

Plonka,"Network Anomaly Confirmation, Diagnosis and Remediation", In: 2009 47th Annual Allerton Conference on Communication, Control, and Computing, Sep. 30, 2009, 8 pages.

Sharma,"Fault Detection and Localization in Distributed Systems using Invariant Relationships", In: IEEE/IFIP Int. Conf. on Dependable Systems and Networks 1 (2013), Aug. 2013, 8 pages.

Sheth,"MOJO: A Distributed Physical Layer Anomaly Detection System for 802.11 WLANs", In: Proc. of the 4th int. conf. on Mobile systems, applications and services (2006), Jun. 22, 2006, pp. 191-204.

Tan,"PREPARE: Predictive Performance Anomaly Prevention for Virtualized Cloud Systems", In: Distributed Computing Systems (ICDCS). vol. 2012, Jun. 2012, 10 pages.

Thottan,"Proactive Anomaly Detection Using Distributed Intelligent Agents", In: Network, IEEE Oct. 1998, Oct. 1998, pp. 21-27.

Wang,"Fault Detection for Cloud Computing Systems with Correlation Analysis", 2015 IFIP/IEEE International Symposium on Integrated Network Management (IM), Jul. 2015, 7 pages.

"Notice of Allowance", U.S. Appl. No. 15/970,831, dated Nov. 21, 2019, 8 pages.

Wolf,"Unsupervised Creation of Parameterized Avatars", Apr. 2017, 9 pages.

\* cited by examiner

ANOMALY DETECTION FOR INCREMENTAL APPLICATION DEPLOYMENTS

BACKGROUND

An incremental release of a new version of a software application (also known as a "canary release") is a technique to reduce risk when releasing a new version of the application. This is accomplished by releasing the new version of the application (the canary or the incremental application) to a subset of users of a stable or legacy version of the application and the canary version of the application is released alongside the legacy version of the application. In other words, some on-line users of the legacy version of the application will be routed to the canary version of the application while most users will continue to be routed to the legacy version of the application. Typically, this event is transparent to users of the legacy version of the application, e.g., a user of a user device routed on-line to the canary version of the application does not know that the canary is a new version of the legacy application.

The legacy version of the application is considered stable because its anomalies have been mostly resolved, either before its release or as they occurred. Typically, the canary version of the application is evaluated manually by comparing metrics of the canary version with metrics of the legacy version of the application. If there is significant degradation in the metrics of the canary version relative to the metrics of the legacy version of the application, then the canary version can be rolled-back and "test" user devices can be routed back to the legacy version of the application. In this manner, the overall impact of the unexpected behavior may be limited to the subset of unknowing users.

Conventional monitoring of an incremental application release is performed manually. A developer or a release engineer observes graphs and logs from the legacy version of the application and the incremental version of the application to determine how closely metrics of the incremental application match metrics of the legacy application. This manual monitoring requires significant effort, and even with multiple developers and release engineers observing the metrics, many problems with the incremental application are missed due to the limited amount of information that humans can observe and process.

SUMMARY

Systems and techniques are described for anomaly detection for incremental application deployments. An incremental application is usually a new version of an existing legacy software application. The incremental version of the application is deployed alongside the legacy software version of the application, which is in use by users. Once deployed, a subset of user traffic is routed from the legacy version of the application to the incremental application so that only a portion of on-line users are routed to the incremental version of the application. In this manner, problems with the incremental version of the application may be quickly identified without impacting a substantial number of the users. These problems (anomalies) may be identified by comparing performance metrics of the incremental application to performance metrics of the legacy version of the application.

The systems and techniques described are implemented to automate anomaly detection for incremental application deployments. By automating the anomaly detection, more problems with the incremental version of the application may be identified than is possible with conventional systems and techniques which are limited to manual observations. In this way, the new version of the software application can be fully deployed with increased confidence and lower risk.

In an example, an error record is generated for a stable, legacy software application. The error record is generated for the legacy version of the application to learn which errors exist in the legacy version of the application in its present state. The data in the error record for the software application is organized, such as by using natural language processing, to group the data in the error record for the software application into one or more groups, each having a group membership criterion. For example, each of the one or more groups may represent an error type or a class of error types which exists in the legacy version of the application in its present state.

An error record is also generated for an incremental application for anomaly detection of the deployed incremental version of the application. This error record is generated to learn which errors exist in the incremental application so that anomalies in the incremental version of the application may be identified. The data in the error record for the incremental version of the application is organized, such as by using natural language processing. For example, the organized data may represent an error type or a class of error types which exists in the incremental version of the application. If the organized data from the error record of the incremental version of the application does not belong to any of the one or more groups according to the group membership criterion, as established from the error record of the legacy software application, then the organized data from the error record in the incremental application is identified as an anomaly. An alert of the anomaly may be generated to indicate the incremental application deployment may be at risk. For example, the alert may indicate that "test" users currently routed to the incremental application should be routed back to the legacy version of the application.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
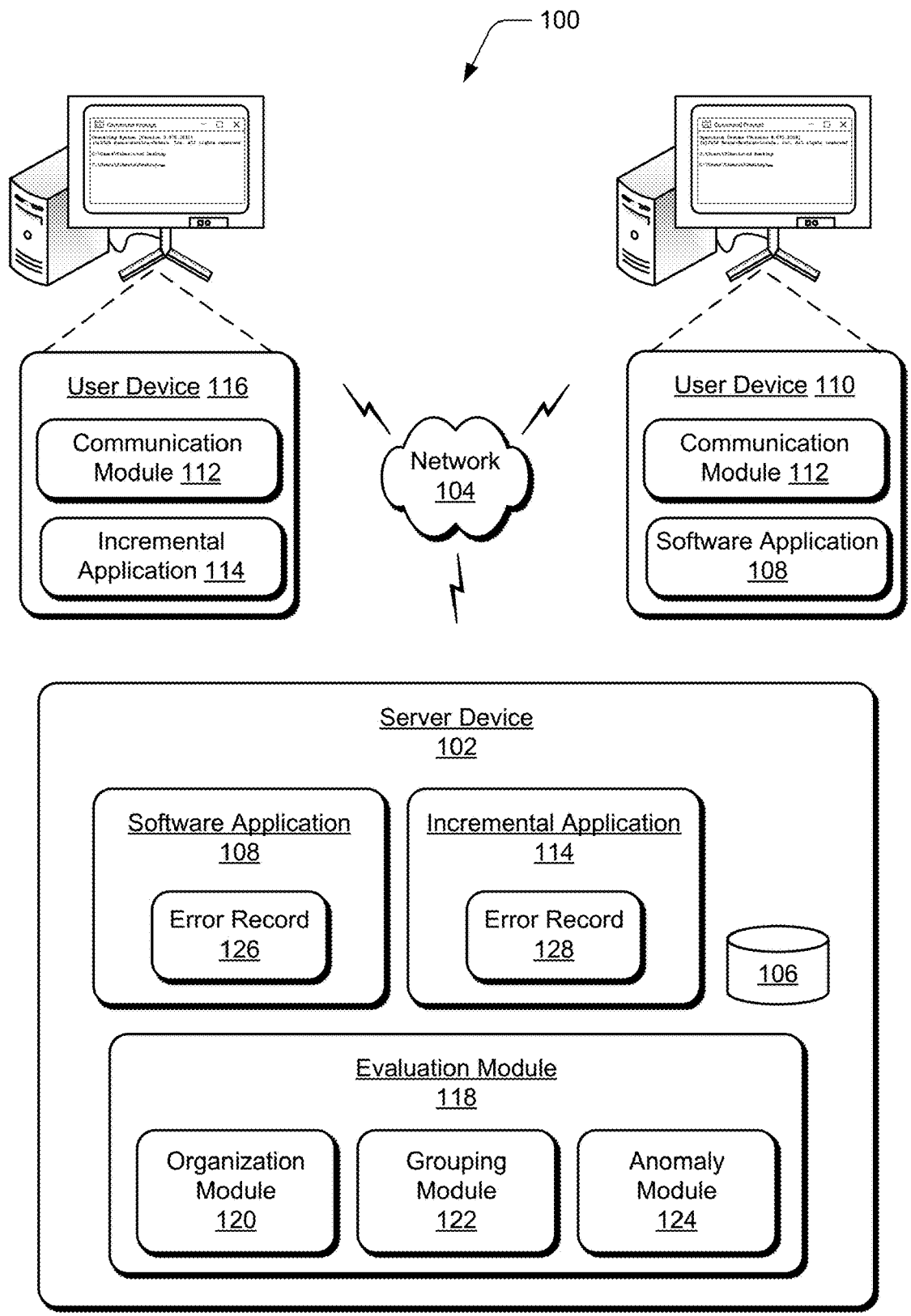
FIG. 1 is an illustration of an environment in an example implementation that is operable to employ digital systems and techniques as described herein.

An incremental application release is a technique to reduce risk in releasing a new version of a software application. This is accomplished by releasing the new version of the application (the incremental application) to a subset of users of a legacy version of the application, and the incremental application is released alongside the legacy version of the application, which is still in use by most of the users. Typically, this event is transparent to on-line users of the legacy version of the application, meaning a user of a user device routed on-line to the incremental application does not know that the incremental application is a new version of the legacy application. Performance of the incremental application can be evaluated by comparing metrics of the incremental application with metrics of the legacy version of the application. If there is significant degradation in the metrics of the incremental application relative to the metrics of the legacy version of the application, then the incremental application can be rolled-back and all of the test user devices can be routed back to the legacy version of the application. In this manner, the overall impact of the unexpected behavior may be limited to the subset of unknowing users.

Rather than the significant effort required for manual conventional monitoring of an incremental application release, systems and techniques are described for automatic anomaly detection for incremental application deployments. These systems and techniques are implemented to reduce manual monitoring efforts and increase stability of new application version delivery by processing more monitoring data than is possible when manually monitoring an incremental application release. The systems and techniques also reduce risk of individual deployments and reduce reaction time in cases where issues are identified. In this way, the new version of the application can be fully deployed with increased confidence and lower risk.

In an example, an error record is generated for a legacy software application. This error record is generated to learn which errors exist in the legacy version of the application in its present state. Generating an error record of the legacy software application also ensures that the error log is representative of the present state of the software application. For example, generating the error record of the legacy software application minimizes the likelihood that extraneous data will be included in the error record. After generation, data in the error record for the software application can be processed to remove noise, such as extraneous user identifications, numbers, etc.

The data in the error record for the software application is organized, such as by using natural language processing. Examples of natural language processing techniques may include TF-IDF, BLUE, etc. The organized data in the error record for the software application is grouped into one or more groups, each having a group membership criterion. For example, the organized data in the error record for the software application may be clustered by k-means clustering the organized data into one or more clusters, each having a cluster radius. In this example, each of the one or more clusters may represent an error type or a class of error types which exists in the legacy software application in its present state. A number of clusters may be detected by calculating multiple different numbers of clusters and selecting the first cluster number to achieve an inertial score (sum of squared distances of samples to their closest cluster center) below a threshold. For example, the threshold may be designated at one-hundred.

An error record is also generated for an incremental application for anomaly detection of the deployed incremental application. This error record is generated to learn how the incremental application is performing relative to the legacy version of the application. After generation, data in the error record for the incremental application can also be processed to remove noise. For example, noise may include user identifications, numbers, and any other extraneous information that is not relevant for error log processing. The data in the error record for the incremental application is organized, e.g., using natural language processing. Once organized, the data in the error record for the incremental application may represent an error type or a class of error types which exists in the incremental application. The organized data in the error record for the incremental application is grouped into the nearest cluster of the one or more clusters of error record data, as established based on the error record for the software application. If organized data from the error record of the incremental application is located outside of a cluster radius of the nearest cluster of the one or more clusters of error record data for the software application, then the organized data from the error record of the incremental application that is located outside of the cluster radius of the nearest cluster is identified as an anomaly. In other words, if the organized data from the incremental application error record does not fit into its nearest cluster of the software application error record data, then the organized data may represent an error type or a class of error types unique to the incremental application and thus it is identified as an anomaly.

An alert of the anomaly may be generated to indicate that the incremental application deployment may be at risk. For example, the alert may indicate that users currently routed to the incremental application version should be routed back to the legacy version of the application. A number of times that an anomaly is identified may be determined, and the number of times that an anomaly is identified may be compared to a threshold. For example, the threshold may be two. If the number of times that the anomaly is identified is greater than or equal to the threshold, then the anomaly may be identified as a new error type, indicating possible unexpected behavior or another problem of the incremental version of the application. The new error type may be an indication that users currently routed to the incremental application version should be routed back to the legacy application version.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a server device 102 connected to a network 104. The server device 102 may be configured as a desktop computer, a laptop computer, a mobile device (e.g., assuming a handheld configuration such as a tablet or mobile phone), and so forth. Thus, the server device 102 may range from a full resource device with substantial memory and processor resources (e.g., personal computers, game consoles) to a low-resource device with limited memory and/or processing resources (e.g., mobile devices). Additionally, the server device 102 may be representative of a plurality of different devices, such as multiple servers utilized by a business to perform operations "over the cloud."

The server device 102 includes a storage device 106 and is illustrated to include a software application 108 to provide, e.g., a service to a user device 110 through a communication module 112 of the user device 110. The software application 108 or legacy version of the application may be implemented partially in hardware of the server device 102. Although illustrated as implemented locally at the server device 102, functionality of the software application 108 may be also be implemented in whole or in part via functionality available via the network 104, such as part of a web service or "in the cloud."

The server device 102 is illustrated to include an incremental application 114 which is a new version of the software application 108 and the incremental application 114 is implemented for error evaluation before full deployment. The incremental application 114 may be implemented partially in hardware of the server device 102 to provide, e.g., a service to the user device 110 through the communication module 112 of the user device 110. Although illustrated as implemented locally at the server device 102, functionality of the incremental application 114 may also be implemented in whole or in part via functionality available via the network 104, such as part of a web service or "in the cloud."

In this example, the software application 108 is generally a stable application or a legacy application and the incremental application 114 is a new or development version of the software application 108. Server device 102 is accessible via the network 104 to user device 110, which runs an instantiation of the software application 108. An incremental release of a new software application (also known as a "canary release") is a technique to reduce risk when releasing the new version of the application. This is accomplished by releasing the new version of the application (the canary release) to a subset of users of the legacy version of the application. Typically, this event is transparent to on-line users of the legacy version of the application, e.g., a user of a user device 116 routed to the incremental application 114 does not know that the canary release is a new version of the legacy version of the application.

The server device 102 is also accessible via the network 104 to the user device 116, which uses an instantiation of the incremental application 114 instead of the software application 108. The incremental application 114 (e.g., the canary version of the application) is evaluated by comparing metrics of the incremental application version with metrics of the legacy version of the application. If there is significant degradation in the metrics of the incremental application version relative to the metrics of the legacy application, then the incremental application version can be rolled-back and all user devices 116 can be routed back to the legacy version of the application. In an example, the software application 108 is the legacy version of the application and the incremental application 114 is the canary version of the application. The incremental application 114 is made accessible or released to a subset of users of the software application 108. In this manner, the incremental application 114 may be evaluated against the software application 108. If there is significant degradation in metrics of the incremental application 114 relative to metrics of the software application 108, then the incremental application 114 can be rolled-back and all user devices 116 can be routed to the software application 108.

In this example, the server device 102 includes an evaluation module 118. The evaluation module 118 may be implemented partially in hardware of the server device 102 to provide, e.g., information about the incremental application 114 and the software application 108. Although illustrated as implemented locally at the server device 102, functionality of the evaluation module 118 may also be implemented in whole or in part via functionality available via the network 104, such as part of a web service or "in the cloud." The evaluation module 118 includes an organization module 120, a grouping module 122, and an anomaly module 124. Although illustrated as separate modules, the organization module 120, the grouping module 122, and the anomaly module 124 may be implemented as a single module or as the evaluation module 118.

The software application 108 is illustrated to include an error record 126, e.g., an error log. The error record 126 of the software application 108 includes error data associated with execution of the software application 108. The error record 126 of the software application 108 also includes errors of software application 108 in its present state. The incremental application 114 is also illustrated to include an error record 128, e.g., an error log. The error record 128 of the incremental application 114 includes error data associated with the incremental application 114.

The organization module 120 is implemented to organize data of the error record 126 of the software application 108 and to organize data of the error record 128 of the incremental application 114. For example, the organization module 120 may organize data using natural language processing. Examples of natural language processing techniques may include TF-IDF, BLUE, etc. As part of organizing the data of the error record 126 or data of the error record 128, the organization module 120 can process the data to remove noise from the error records. Removing noise from the error records increases efficiency in processing. For example, noise may include user identifications, numbers, etc.

The grouping module 122 may be implemented to group organized data of the error record 126 of the software application 108 into one or more groups, where each of the groups has a group membership criterion. For example, the grouping module 122 may use k-means clustering to group the organized data of the error record 126 into one or more clusters, where each of the one or more clusters has a cluster radius. In this example, one or more clusters may represent an error type or a class of error types which exists in the software application 108 in its present state. The grouping module 122 can be configured to automatically detect a number of clusters. The number of clusters can influence rates of false-positive detection and false-negatives. A high number of clusters tends to increase false-positive detection meaning it is easier for an identified error to fit into a cluster when it should not fit into the cluster. A low number of clusters tends to increase false-negatives meaning it is easier for an identified error to not fit into a cluster when it should fit into the cluster. Thus, the grouping module 122 is implemented to detect a number of clusters by calculating multiple different numbers of clusters and selecting the first cluster number to achieve an inertial score (sum of squared distances of samples to their closest cluster center) below a threshold. For example, the threshold may be one-hundred but other thresholds are contemplated.

The anomaly module 124 may be implemented to determine whether organized data of the error record 128, as associated with the incremental application 114, belongs to any of the groups according to the group membership criterion, as established from the analysis of the error record 126 associated with the software application 108. If the organized data of the error record 128 belongs to one of the groups, then the organized data of the error record 128 represents an error that has already been identified as existing in the legacy software application 108 and is therefore not anomalous by its existence alone. Alternatively, if the organized data of the error record 128 does not belong to any of the established groups, then the organized data of the error record 128 represents an error that has not been identified or associated with the legacy software application 108. The unfamiliar error is determined as an anomaly, which may be indicative of an issue with the incremental application 114. The presence of the anomaly may indicate that the incremental application 114 should be rolled-back and any of the user devices that are routed to the incremental application 114 should be routed to use the software application 108. For example, the anomaly may indicate that user device 116 should be routed back to the software application 108.

In this example, the anomaly module 124 may identify a nearest cluster of the one or more clusters for an organized data, and determine if the organized data is located within the cluster radius of the nearest cluster. As used herein, cluster radius means a maximum distance between a cluster member and a center of a cluster. In other words, if a sphere contained all members of a cluster and a center of the cluster is a center of the sphere, then a radius of the sphere is a cluster radius of the cluster.

If the organized data is within the cluster radius of the nearest cluster, then the organized data belongs to the nearest cluster, which indicates that the organized data represents an error that has already been identified as existing in the legacy software application 108. If the organized data is outside of the cluster radius of the nearest cluster, then the organized data does not belong to any of the one or more clusters, which indicates that the organized data represents an error that has not been identified or associated with the legacy software application 108. The anomaly module 124 may identify organized data of the error record 128 that does not belong to any of the one or more clusters as an anomaly. In an example, the anomaly module 124 can be implemented to generate an alert of the anomaly. The alert may indicate that the incremental application 114 should be rolled-back and any of the user devices that are routed to the incremental application 114 should be routed to use the software application 108. For example, the alert may indicate that user device 116 should be routed back to the software application 108.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1.

Figure 2:
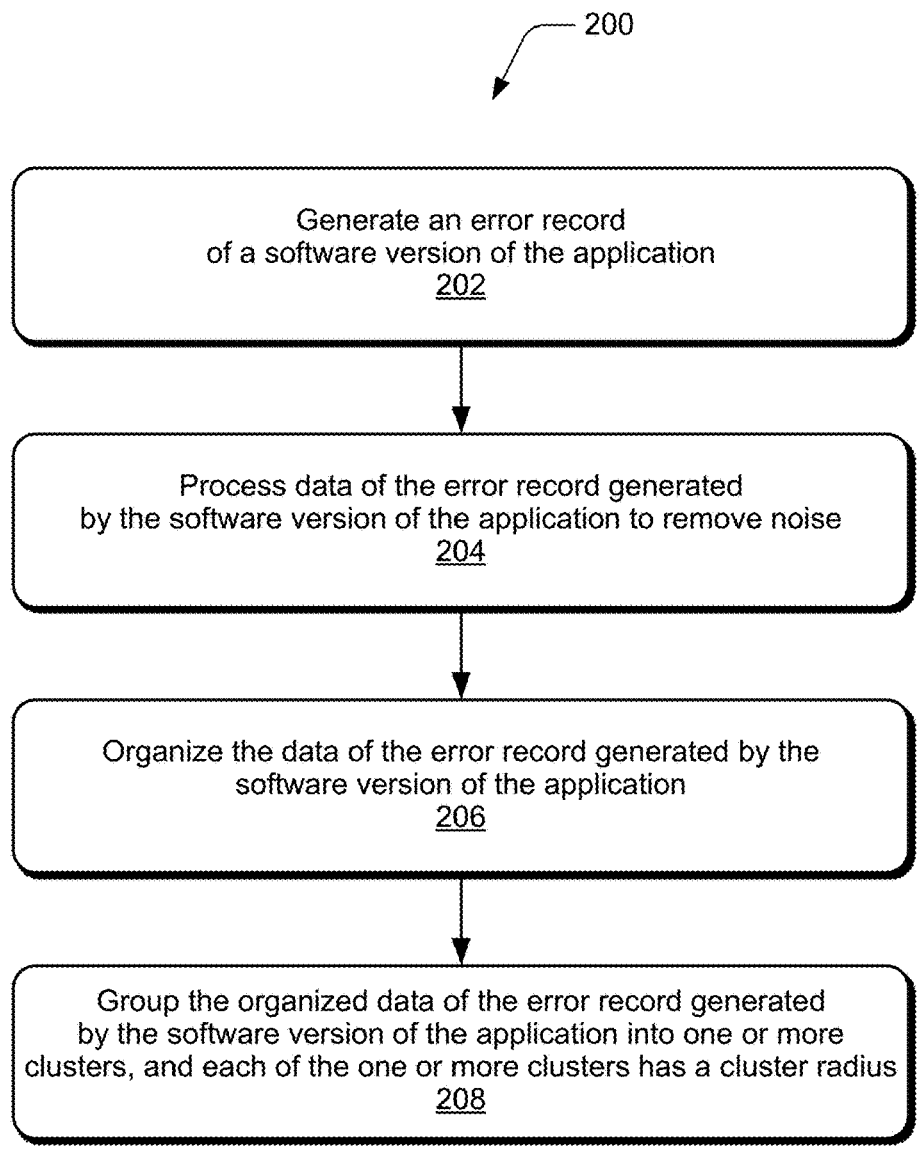
FIG. 2 is a flow diagram depicting a procedure in an example implementation in which a software application error record is generated, data from the error record is organized, and organized data from the error record is grouped into one or more groups.

FIG. 2 is a flow diagram depicting a procedure 200 in an example implementation in which a software application error record is generated, data from the error record is organized, and organized data from the error record is grouped into one or more groups. To begin, the error record 126 of the legacy software application 108 is generated (at 202), e.g., using any suitable error record generation technique. Generating the error record 126 of the software application 108 provides that the error record 126 reflects a present status of the software application 108. Reflecting the present status of the software application 108 is important because error records for legacy or stable applications often contain data that is not relevant for evaluation of the incremental application 114. For example, an error record for a legacy or stable application may contain data for resolved errors, obsolete errors, extraneous information, etc. Once the error record 126 of the software application 108 is generated, data in the error record 126 is processed to remove noise (at 204). For example, noise may include user identifications, numbers, and any other extraneous information that is not relevant for error log processing and comparisons by the evaluation module 118. Data of the error record 126 is organized by natural language processing (at 206). For example, the organization module 120 may organize data of the error record 126 using natural language processing. Some examples of natural language processing techniques may include TF-IDF, BLUE, etc.

The organized data of the error record 126 of the software application 108 is grouped into one or more groups, where each of the groups has a group membership criterion (at 208). Each of the groups represents an error type or a class of error types which exists in the present state of the software application 108. The groups are described as clusters but other grouping techniques are contemplated. For example, the grouping module 122 may use k-means clustering to group the organized data of the error record 126 into one or more clusters wherein each of the one or more clusters has a cluster radius.

Figure 3:
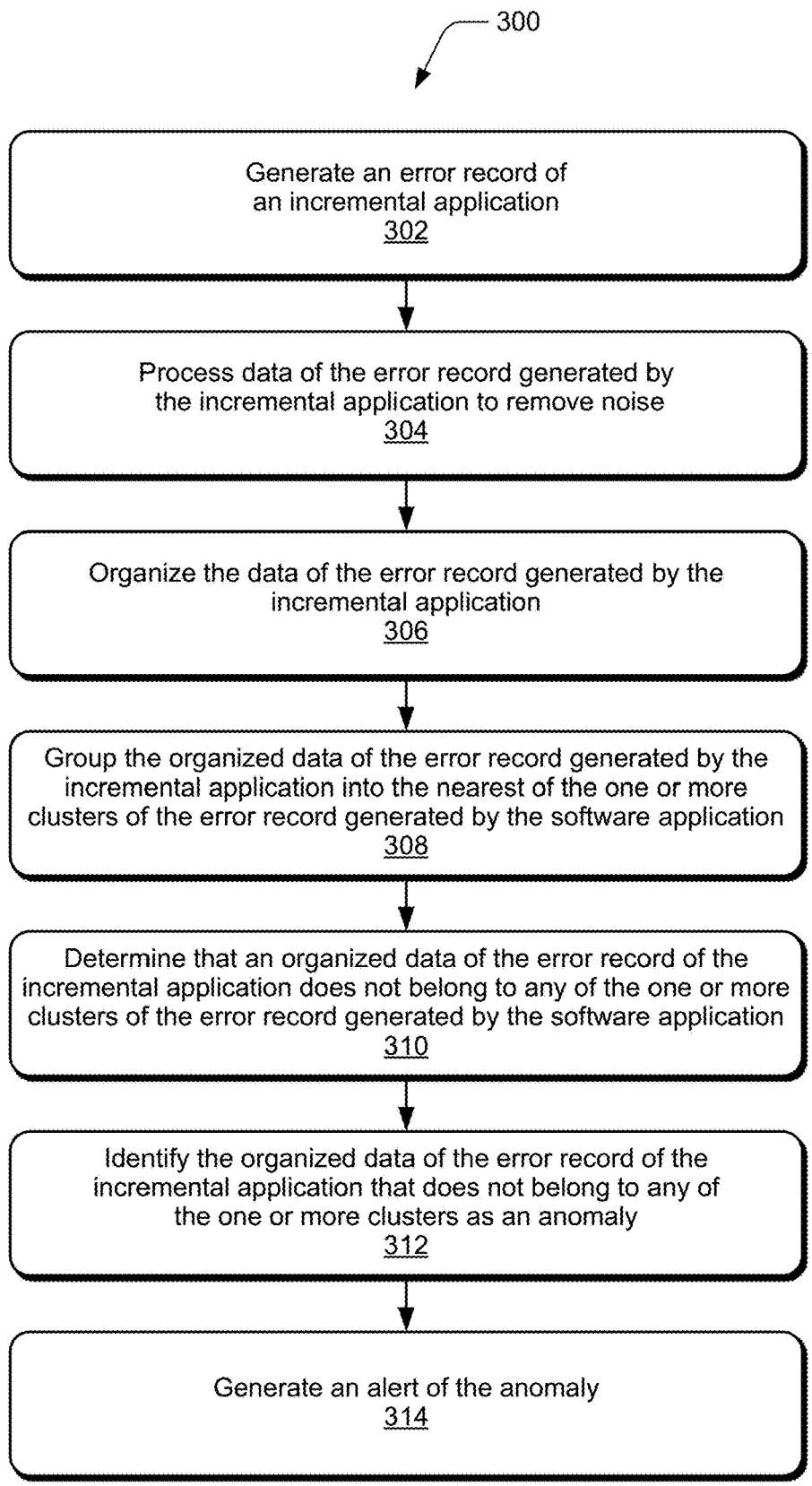
FIG. 3 is a flow diagram depicting a procedure in an example implementation in which an incremental application error record is generated, data from the error record is organized, and organized data from the error record is grouped into the nearest of the one or more clusters of the error record generated by the software application.

FIG. 3 is a flow diagram depicting a procedure 300 in an example implementation in which an incremental application error record is generated, data from the error record is organized, organized data from the error record is grouped into the nearest of the one or more clusters of the error record generated by the software application, it is determined that a organized data of the error record of the incremental application does not belong to any of the one or more clusters of the error record generated by the software application, the organized data of the error record of the incremental application that does not belong to any of the one or more clusters is identified as an anomaly, and an alert of the anomaly is generated.

To begin, the error record 128 of the incremental application 114 is generated (at 302), e.g., using any suitable error record generation technique. Once an error record 128 of the incremental application 114 is generated, data in the error record 128 is processed to remove noise (at 304). As described above, the noise in an error record may include user identifications, numbers, and any other extraneous information that is not relevant for error log processing. Data of the error record 128 is organized (at 306). For example, the organization module 120 can organize the data of the error record 128 using natural language processing. Some examples of natural language processing techniques may include TF-IDF, BLUE, etc. The organized data of the error record 128 of the incremental application 114 is grouped into the nearest of the one or more clusters of the error record 126 of the software application 108 (at 308). It is determined that the organized data of the error record 128 of the incremental application 114 does not belong to any of the one or more clusters of the error record 126 of the software application 108 (at 310). This indicates that the organized data represents an error that has not been identified or associated with the legacy software application 108.

If the organized data is outside of a cluster radius of the nearest cluster, then the organized data does not belong to any of the one or more clusters. The organized data of the error record 128 that does not belong to any of the one or more clusters is identified as an anomaly (at 312). An alert of the anomaly is generated (at 314). This alert may indicate that the incremental application 114 should be rolled-back and any user devices that are routed to the incremental application 114 should be routed to use the software application 108. For example, the alert may indicate that user device 116 should be routed back to the software application 108.

Figure 4:
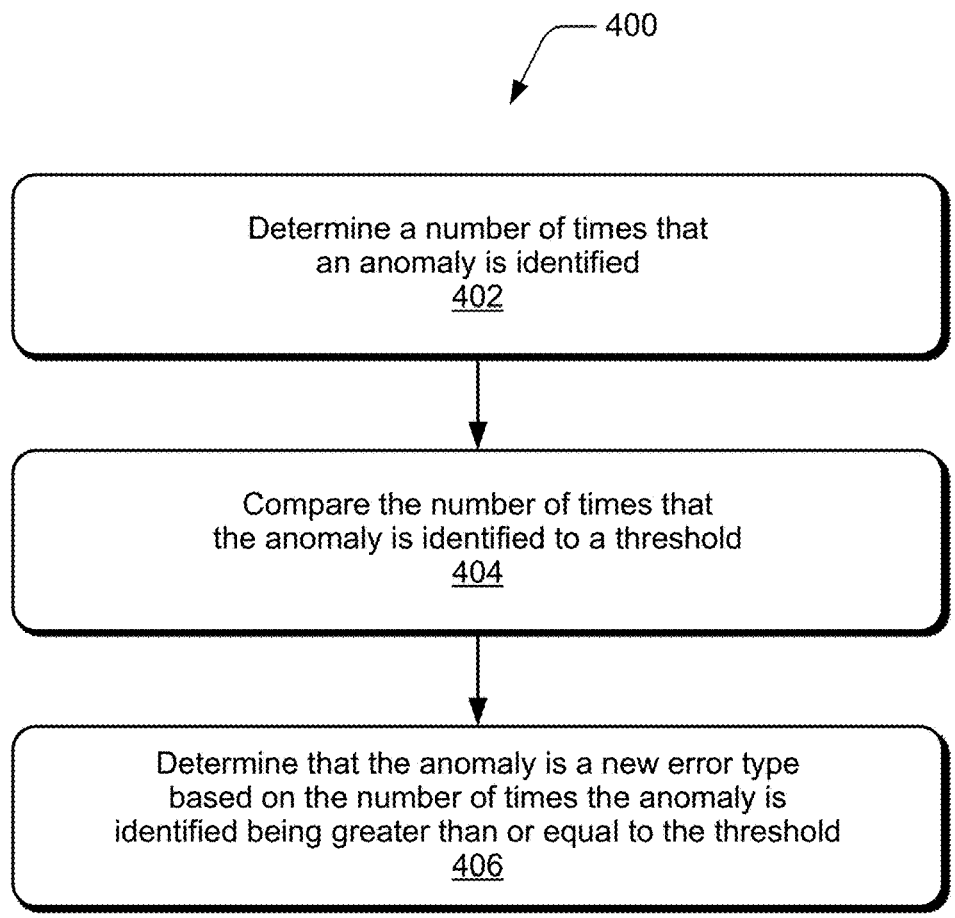
FIG. 4 is a flow diagram depicting a procedure in an example implementation in which a number of times that an anomaly is identified is determined, the number of times that the anomaly is identified is compared to a threshold, and the anomaly is determined to be a new error type based on the number of times the anomaly is identified being greater than or equal to the threshold.

FIG. 4 is a flow diagram depicting a procedure 400 in an example implementation in which the number of times that an anomaly is identified is determined, the number of times that the anomaly is identified is compared to a threshold, and the anomaly is determined to be a new error type based on the number of times the anomaly is identified being greater than or equal to the threshold. A number of times that an anomaly is identified is determined (at 402). For example, if the same anomaly is identified multiple times, then the anomaly may be a new type of error associated with the incremental application 114. The number of times that the anomaly is identified is compared to a threshold (at 404). In an example, the threshold may be two but other thresholds are contemplated. For example, if the anomaly occurs twice or, or more than twice, the anomaly is deemed to be a new error type associated with the incremental application 114. The anomaly is determined to be a new error type based on the number of times the anomaly is identified being greater than or equal to the threshold (at 406). The new error type may indicate that the incremental application 114 should be rolled-back and any user devices that are routed to the incremental application 114 should be routed to use the software application 108. For example, the new error type may indicate that user device 116 should be routed back to the software application 108.

Figure 5:
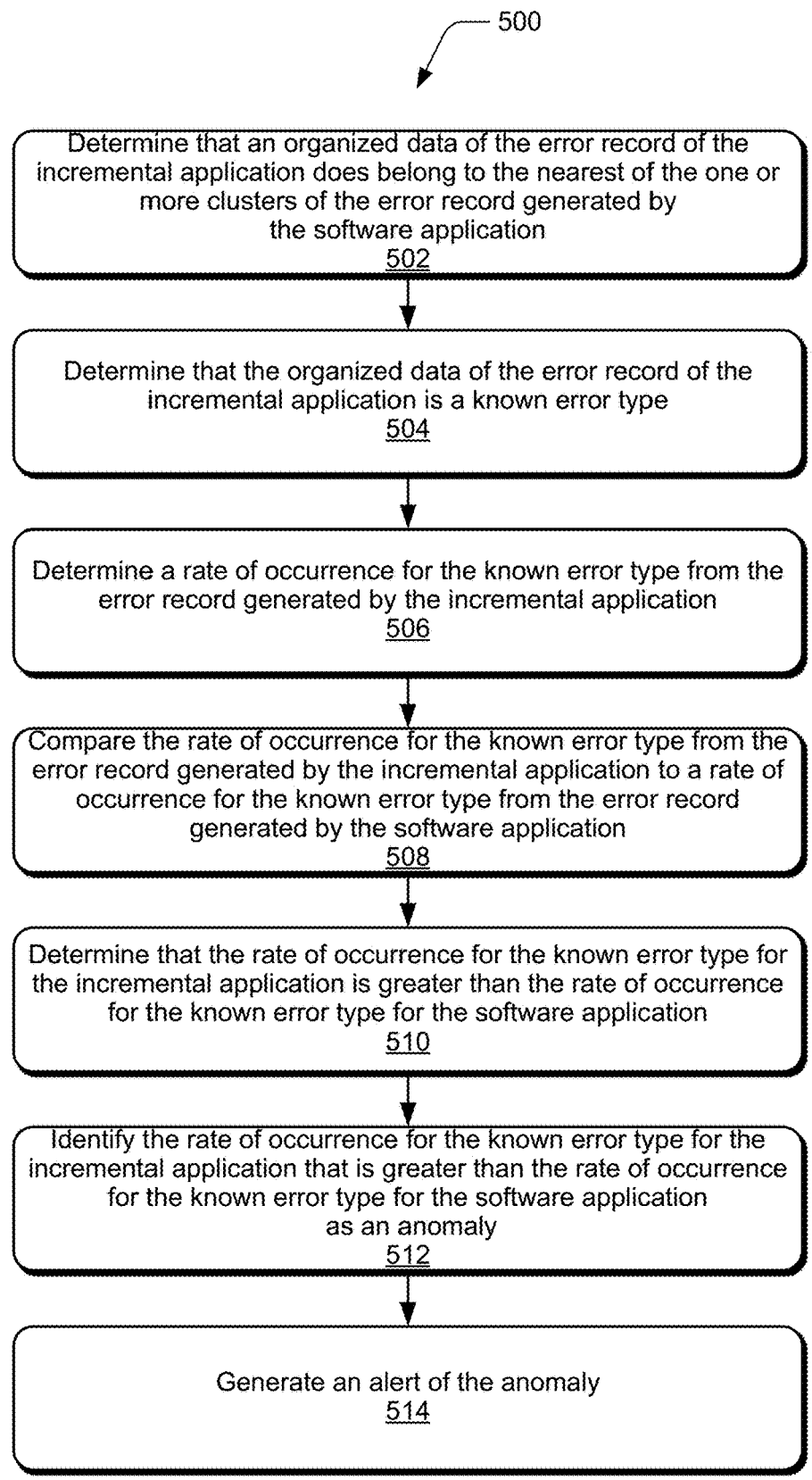
FIG. 5 is a flow diagram depicting a procedure in an example implementation in which an organized data of the error record of the incremental application is determined to belong to a nearest of one or more clusters of the error record generated by the software application, the organized data of the error record of the incremental application is determined to be a known error type, and a rate of occurrence for the known error type from the error record of the incremental application is determined and compared to a rate of occurrence for the known error type from the error record generated by the software application.

FIG. 5 is a flow diagram depicting a procedure 500 in an example implementation in which an organized data of the error record of the incremental application is determined to belong to a nearest of one or more clusters of the error record generated by the software application, the organized data of the error record of the incremental application is determined to be a known error type, and a rate of occurrence for the known error type from the error record of the incremental application is determined and compared to a rate of occurrence for the known error type from the error record generated by the software application. An organized data of the error record of the incremental application is determined to belong to the nearest of the one or more clusters of the error record generated by the software application (at 502). This indicates that the organized data represents an error that has already been identified as existing in the legacy software application 108. The organized data of the error record of the incremental application is determined to be a known error type (at 504).

A rate of occurrence for the known error type is determined from the error record generated by the incremental application (at 506). The rate of occurrence for the known error type from the error record generated by the incremental application is compared to a rate of occurrence for the known error type from the error record generated by the software application (at 508). The rate of occurrence for the known error type for the incremental application is determined to be greater than the rate of occurrence for the known error type for the software application (at 510). In an example, the rate of occurrence for the known error type for the incremental application is determined to be at greater than the rate of occurrence for the known error type for the software application by a predetermined amount. In this way, the predetermined amount can be used as a threshold to identify significant increases the rate of occurrence for the known error type for the incremental application relative to the rate of occurrence for the known error type for the software application.

The rate of occurrence for the known error type for the incremental application that is greater than the rate of occurrence for the known error type for the software application is identified as an anomaly (at 512). In this manner, anomaly detection for incremental application deployments is not limited to detection of errors that are not present in the error record 126 of the software application. An alert of the anomaly is generated (at 514). This alert may indicate that the incremental application 114 should be rolled-back and any user devices that are routed to the incremental application 114 should be routed to use the software application 108.

Example System and Device

Figure 6:
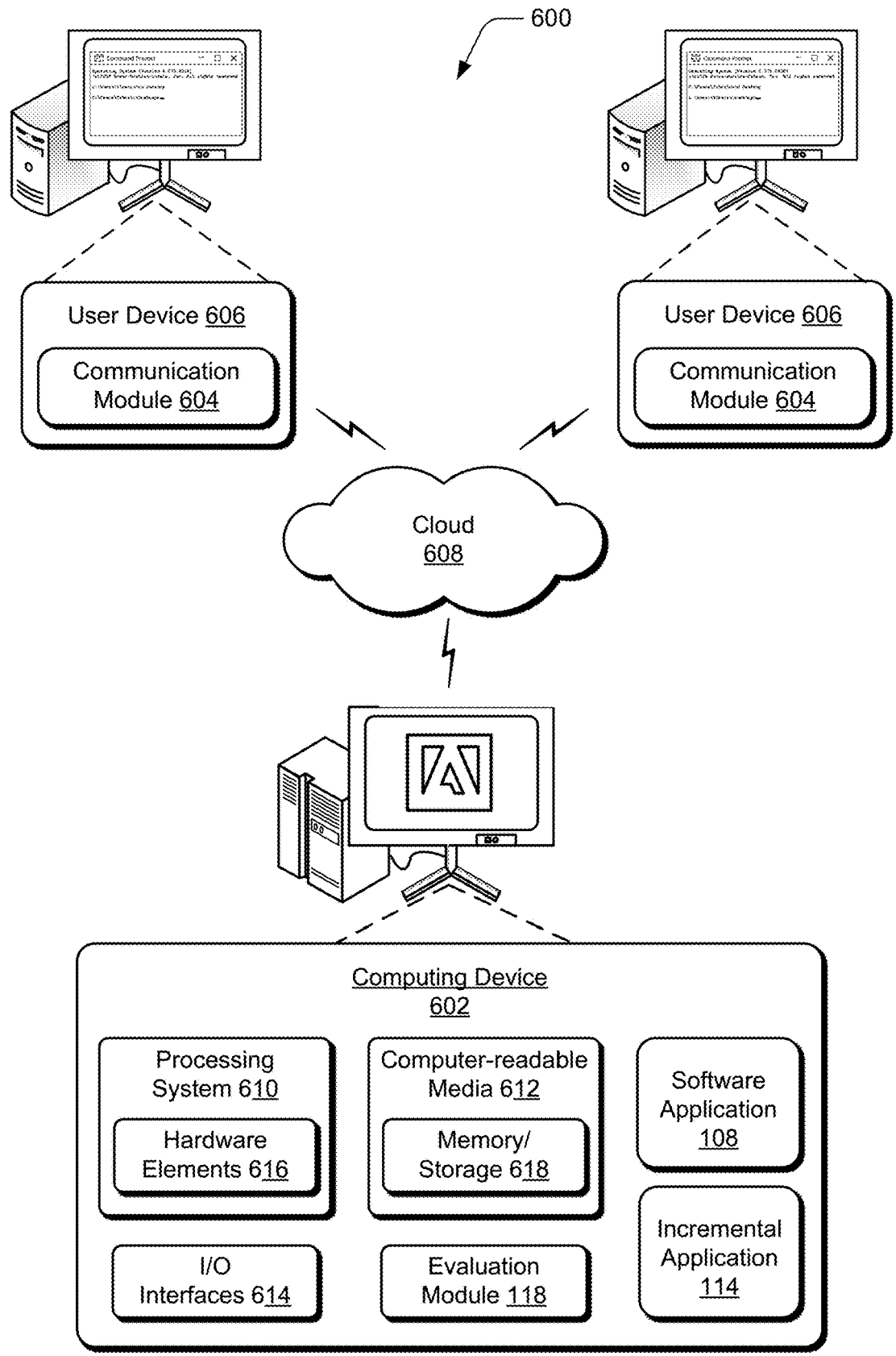
FIG. 6 illustrates an example system with an example computing device that is representative of one or more computing systems and/or devices that may implement the various techniques described herein.

FIG. 6 illustrates an example system generally at 600 that includes an example computing device 602, which is representative of one or more computing systems and/or devices that may implement the various techniques described herein. This is illustrated through inclusion of the evaluation module 118. The software application 108 and/or the incremental application 114 may be available through a communication module 604 of a user device 606 via a cloud

608. The computing device 602 may be, for example, a server of a service provider, a device associated with a client (e.g., a client device), an on-chip system, and/or any other suitable computing device or computing system.

The example computing device 602 as illustrated includes a processing system 610, one or more computer-readable media 612, and one or more I/O interfaces 614 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 610 is representative of functionality to perform one or more operations using hardware. Accordingly, the processing system 610 is illustrated as including hardware elements 616 that may be configured as processors, functional blocks, and so forth. This may include implementation in hardware as an application specific integrated circuit or other logic device formed using one or more semiconductors. The hardware elements 616 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 612 is illustrated as including memory/storage 618. The memory/storage 618 represents memory/storage capacity associated with one or more computer-readable media. The memory/storage component 618 may include volatile media (such as random access memory (RAM)) and/or nonvolatile media (such as read only memory (ROM), Flash memory, optical disks, magnetic disks, and so forth). The memory/storage component 618 may include fixed media (e.g., RAM, ROM, a fixed hard drive, and so on) as well as removable media (e.g., Flash memory, a removable hard drive, an optical disc, and so forth). The computer-readable media 612 may be configured in a variety of other ways as further described below.

Input/output interface(s) 614 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 616 and computer-readable media 612 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 616. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 616 of the processing system 610. The instructions and/or functions may be executable/operable by one or more articles of manufacture (for example, one or more computing devices 602 and/or processing systems 610) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 608 as described below.

The cloud 608 includes and/or is representative of a platform for resources. The platform abstracts underlying functionality of hardware (e.g., servers) and software resources of the cloud 608. The resources may include applications and/or data that can be utilized while computer processing is executed on servers that are remote from the computing device 602. Resources can also include services provided over the Internet and/or through a subscriber network, such as a cellular or Wi-Fi network.

The platform may abstract resources and functions to connect the computing device 602 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 600. For example, the functionality may be implemented in part on the computing device 602 as well as via the platform that abstracts the functionality of the cloud 608.

CONCLUSION

Although the implementation of anomaly detection for incremental application deployments have been described in language specific to structural features and/or methods, it is to be understood that the appended claims are not necessarily limited to the specific features or methods described. Rather, the specific features and methods are disclosed as example implementations of anomaly detection for incremental application deployments, and other equivalent features and methods are intended to be within the scope of the appended claims. Further, various different examples are described and it is to be appreciated that each described example can be implemented independently or in connection with one or more other described examples.

What is claimed is:

1. A method, in a digital environment, to identify an anomaly for an incremental application deployment, the method implemented by at least one computing device, the method comprising:
   organizing data of an application error record generated by a software application;
   grouping the organized data of the application error record from the software application into one or more groups, each of the one or more groups having a group membership criterion;
   organizing data of a generated error record from the incremental application;
   determining that an organized data of the generated error record from the incremental application does not belong to any of the one or more groups according to the group membership criterion;
   identifying the organized data of the generated error record from the incremental application that does not belong to any of the one or more groups as the anomaly; and
   generating an alert of the anomaly.

2. The method of claim 1 further comprising:
   determining a number of times the anomaly is identified;
   comparing the number of times the anomaly is identified to a threshold; and
   determining that the anomaly is a new error type based on the number of times the anomaly is identified being greater than or equal to the threshold.

3. The method of claim 2 wherein the threshold is two.

4. The method of claim 1 wherein the organizing data of the application error record generated by the software application comprises natural language processing.

5. The method of claim 1 wherein the one or more groups are grouped by k-means clustering, and each of the one or more groups is a cluster having a cluster radius.

6. The method of claim 5 wherein the group membership criterion is inside the cluster radius of one of the one or more groups.

7. The method of claim 1 further comprising:
   processing the data of the application error record generated by the software application to remove noise.

8. The method of claim 1 further comprising:
   processing the data of the generated error record from the incremental application to remove noise.

9. A system, in a digital environment to identify an anomaly for an incremental application deployment, the system comprising:
   an organization module implemented in hardware of one or more computing devices to organize data of an application error record generated by a software application and organize data of a generated error record from the incremental application;
   a grouping module implemented in the hardware of the one or more computing devices to group the organized data of the application error record from the software application into one or more groups, each of the one or more groups having a group membership criterion; and
   an anomaly module implemented in the hardware of the one or more computing devices to:
   determine that an organized data of the generated error record from the incremental application does not belong to any of the one or more groups according to the group membership criterion;
   identify the organized data of the generated error record from the incremental application as the anomaly; and
   generate an alert of the anomaly.

10. The system of claim 9 wherein the anomaly module is further implemented to:
    determine a number of times the anomaly is identified;
    compare the number of times the anomaly is identified to a threshold; and
    determine that the anomaly is a new error type based on the number of times the anomaly is identified being greater than or equal to the threshold.

11. The system of claim 10 wherein the threshold is two.

12. The system of claim 9 wherein the organization module is further implemented to process the data of the application error record generated by the software application by natural language processing.

13. The system of claim 9 wherein the clustering module is further implemented to group the one or more groups by k-means clustering, and each of the one or more groups is a cluster having a cluster radius.

14. The system of claim 13 wherein the group membership criterion is inside the cluster radius of one of the one or more groups.

15. One or more non-transitory computer-readable storage media comprising instructions stored thereon that, responsive to execution by a computing device in a digital environment to identify an anomaly for an incremental application deployment, cause operations of the computing device including to:

organize data of an application error record generated by a software application;

group the organized data of the application error record from the software application into one or more groups, each of the one or more groups having a group membership criterion;

organize data of a generated error record from the incremental application;

determine that an organized data of the generated error record from the incremental application does not belong to any of the one or more groups according to the group membership criterion;

identify the organized data of the generated error record from the incremental application that does not belong to any of the one or more groups as the anomaly; and generate an alert of the anomaly.

16. The one or more non-transitory computer-readable storage media of claim 15 wherein the operations of the computing device include to:

determine a number of times the anomaly is identified;

compare the number of times the anomaly is identified to a threshold; and determine that the anomaly is a new error type based on the number of times the anomaly is identified being greater than or equal to the threshold.

17. The one or more non-transitory computer-readable storage media of claim 16 wherein the threshold is two.

18. The one or more non-transitory computer-readable storage media of claim 15 wherein the operations of the computing device include to process the data of the application error record generated by the software application by natural language processing.

19. The one or more non-transitory computer-readable storage media of claim 15 wherein the operations of the computing device include to group the one or more groups by k-means clustering, and each of the one or more groups is a cluster having a cluster radius.

20. The one or more non-transitory computer-readable storage media of claim 19 wherein the group membership criterion is inside the cluster radius of one of the one or more groups.

* * * * *